Jan. 23, 1940.  W. C. B. SMITHUYSEN  2,188,254
CONCENTRATION OF AQUEOUS ALKENE HALOHYDRIN SOLUTIONS
Filed Oct. 25, 1937
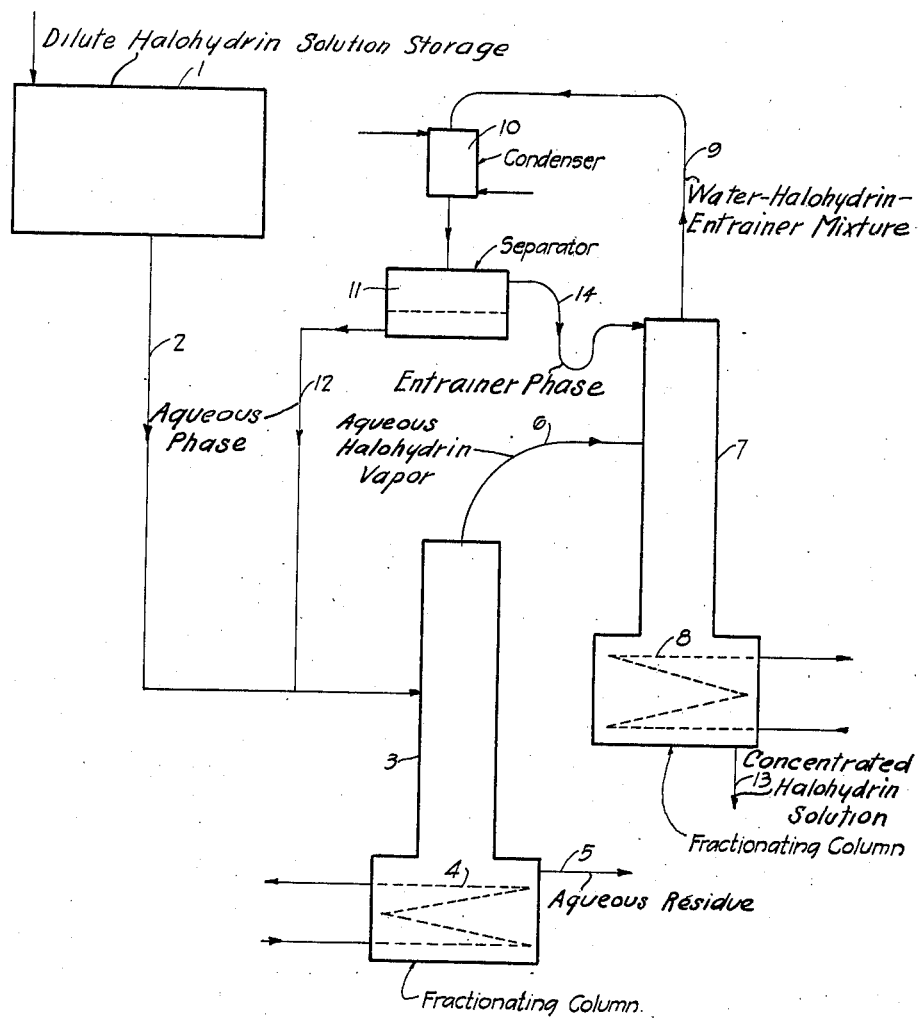
Inventor:
Wilhelm Carel Brezesinska Smithuysen.
By His Attorney Arthur B. Bakalar Patented Jan. 23, 1940

2,188,254

UNITED STATES PATENT OFFICE 2,188,254

CONCENTRATION OF AQUEOUS ALKENE HALOHYDRIN SOLUTIONS

Wilhelm Carel Brezesinska Smithuysen, Amsterdam, Netherlands, assignor to Shell Development Company, San Francisco, Calif., a corporation of Delaware Application October 25, 1937, Serial No. 170,840
In the Netherlands November 17, 1936

9 Claims. (Cl. 202—42)

The present invention relates to the manufacture of halohydrins and more particularly to the manufacture of ethylene chlorhydrin.

The object of the invention is to provide a method whereby aqueous solutions of halohydrin containing a greater concentration of halohydrin than the respective halohydrin-water azeotropic mixture may be produced in a more economical manner.

This is accomplished, according to the present invention, by executing the process continuously in a certain prescribed manner and in such a combination of steps as to result in a method affording substantial heat economies.

Halohydrins may be prepared according to any one of several schemes, such as the reaction of a glycol with a hydrogen halide, an olefine with a hypohalous acid, an allyl type alcohol with a halogen or an olefine oxide with a hydrogen halide. Due to the abundance of olefine hydrocarbons, the method wherein an olefine is reacted with a hypohalous acid is by far the most important from a commercial standpoint. In this method, however, the halohydrin must be recovered from a dilute aqueous solution containing hydrogen halide. Due to the particular physical character of the lower halohydrins, especially the most important member, ethylene chlorhydrin, their recovery from such dilute solutions and the concentration of such solutions have proven to be very expensive operations, costing more in fact than the raw materials.

Halohydrin solutions of desirable concentration are made, according to the present invention, by a two step continuous process using the principle of azeotropic distillation. In the first step, a partial concentration is accomplished by a fractionation of the dilute solution, and in the second step the partially concentrated material is concentrated to the desired degree by a fractionation in the presence of an entraining agent.

I have found that very decided economies may be realized when the operations are executed in a continuous manner. This is not only due to the normal advantages of continuous operation over batch operation, but is also due to the fact that by operating continuously certain conditions may be maintained to give decided heat economies.

While it is the custom to neutralize the free acid before attempting the concentration, I have found it more desirable to operate with the acid solution, i. e., without first neutralizing the free halogen acid. The elimination of the neutralizing step has three advantages, to wit: (1) the cost of the neutralizing agent is eliminated, (2) the free halogen acid may be recovered, (3) less halohydrin is saponified during the concentration with a consequent better yield. With respect to the first advantage, it should be noted that while the cost of a certain few neutralizing agents, such as marble chips, is very slight, the salts resulting from the neutralization are quite detrimental. I have found that in the presence of $CaCl_2$, for example, the yield of alkene chlorhydrin is considerably impaired. This is probably due to the formation of a $CaCl_2$—alkene chlorhydrin complex. With respect to the third advantage, although a halohydrin-water constant boiling mixture free from acid may be fractionated from a dilute, acid halohydrin solution, I have found this method uneconomical when applied to batch methods, since under these conditions a small percentage of the halohydrin is hydrolyzed. When it is considered that the original concentration of halohydrin is usually about 6%, it is seen that even very small amounts of hydrolysis have an appreciable effect upon the yield. For example, I have found that from 2 to 5% of ethylene chlorhydrin is lost through this cause on batch distillation. When operating in a continuous manner, on the other hand, I have found that the loss due to hydrolysis is reduced to a negligible amount.

With respect to the use of an entrainer for the azeotropic removal of water, I have found that the maximum heat efficiency is not realized by first fractionating the dilute solution to obtain the halohydrin-water constant boiling mixture, adding an entrainer thereto and subsequently removing all the water therefrom in a second distillation. Likewise, it is grossly uneconomical to add the entrainer directly to the dilute solution whereby the concentration is accomplished in one operation. In the preferred embodiment of my invention, I first fractionate the dilute aqueous halohydrin solution to take off a top product considerably more concentrated in halogen than the original solution, but containing appreciably less halohydrin than the corresponding halohydrin-water azeotrope. The optimum concentration of the distillate is dependent upon the halohydrin in question and upon the entraining agent used in the following step. When using benzene as an entraining agent in the concentration of ethylene chlorhydrin solution, I have found the optimum concentration in the distillate from the first fractionation to be about 38% ethylene chlorhydrin. This mode of operation not only accomplishes a considerable saving of heat when in conjunction with the following steps, but also is to a good measure responsible for the effectiveness of operating with the acid solution. When operating under these conditions, it is found that the time that the halohydrin is subjected to heat and acid is at a practical minimum, and this contributes to the elimination of the hydrolysis reaction.

In contradistinction to known processes, I pass the vaporous halohydrin-water mixture, from the fractionation of the dilute solution, without first condensing, directly into a second fractionating column containing the entrainer. This procedure, which is applicable only when operating continuously, results in a considerable saving of heat.

In a second fractionating column wherein water is removed with the aid of a suitable entrainer, I accomplish the further concentration of the halohydrin solution. According to this method of operation, I may recover final concentrations of halohydrin ranging from slightly above the concentration of the halohydrin-water constant boiling mixture up to about 90% halohydrin. If it is endeavored to produce still higher concentrations, it is found that the product is contaminated with the entraining agent and consequently must be subjected to a further fractionation treatment to remove the same. In the concentration of ethylene chlorhydrin solution, I find it most economical to produce a solution containing from 50 to 60% chlorhydrin.

In order that my invention may be better understood, reference may be had to Fig. I illustrating schematically a suitable assembly of apparatus by means of which the process may be carried out. 1 represents a storage tank containing the dilute aqueous halohydrin solution. If it is preferable, for any reason, to forfeit the economy afforded by the use of an acid solution and either partially or completely neutralize the solution previous to fractionation, this tank may, if desired, be equipped with suitable agitating means, inlet for introducing the neutralizing agent, etc. The dilute aqueous, preferably acid, halohydrin solution is caused to flow continually via a pipe 2 into a suitable fractionating apparatus 3 being introduced into the column thereof, preferably at the correct position as calculated by the well known methods. If desired, the solution may be preheated before entering the fractionating apparatus 3 or it may be introduced as a saturated vapor. The required amount of heat is supplied to the fractionating apparatus by any of the suitable conventional methods, such as by a closed hot coil 4. The aqueous solution from which the halohydrin has been substantially removed issues via a pipe 5. In the concentration of ethylene chlorhydrin, for example, this lean solution, contains less than 1% of ethylene chlorhydrin. The actual percentage of exit halohydrin, affording the most economical process, is, however, dependent upon the cost of thermal units and the value of the product and should be regulated within very narrow limits. The overhead distillate from fractionating apparatus 3 containing a concentration of halohydrin appreciably lower than the halohydrin-water constant boiling mixture is passed continuously as a saturated vapor via a pipe 6 directly into a second fractionating apparatus 7 being likewise introduced at a suitable point in the column. The necessary heat is supplied to the apparatus 7 by a conventional means such as a hot coil 8. The final concentrated aqueous halohydrin solution issues via a pipe 13. The overhead product from fractionating apparatus 7 consisting of a mixture of entraining agent, water and halohydrin passes continually via a pipe 9 to a suitable condenser 10 and thence to a suitable separator vessel 11 wherein the aqueous and hydrocarbon phases are continually separated. The aqueous phase, which contains a small amount of halohydrin is preferably returned to the first fractionating apparatus 3, for example, via a pipe 12. The hydrocarbon phase is continually returned to the second fractionating apparatus via a pipe 14. In Fig. I the pipe 14 is arranged to convey the upper layer to fractionating apparatus 7 and pipe 12 is arranged to convey the lower phase into pipe 2 by means of which it is returned to fractionating apparatus 3. This arrangement is applicable when the hydrocarbon phase is lighter than the aqueous phase and settles to the top. If, however, ethylene chloride or any other material having a density greater than the aqueous phase, is used as an entrainer, it will collect in separator 11 as the lower phase and in such case the vertical relation of the outlets to 12 and 14 must be reversed. If desired, the hydrocarbon from separator 11 may be first vaporized before being introduced at a suitable point into fractionating apparatus 7. To accomplish this a suitable vaporizer may be inserted into line 14.

As an entrainer, I may use benzene, paraffin hydrocarbons or petroleum fractions boiling below 110° C., cycloparaffins boiling below 110° C., ethylene dichloride, isopropyl ether, mixed ethers such as methyl tertiary butyl ether, and the like. The requirements of a suitable entrainer are: it must form a minimum boiling mixture with water; it must be relatively immiscible with water; it must distill with water at a temperature appreciably lower than the boiling point of the halohydrin in question; it must not react chemically with the halohydrin and it must be stable at its boiling point. While I may use any compound or mixture of compounds satisfying these requirements, I prefer to use benzene as an entrainer when concentrating ethylene chlorhydrin, since in this combination the least amount of heat is required to remove a given quantity of water.

While the present invention is applicable to the concentration of any of the lower alkene halohydrins, I find it particularly suited for the production of ethylene halohydrin, and most particularly for the production of solutions containing from about 42.5% to about 90% by weight of ethylene chlorhydrin. It is obviously immaterial from what source the halohydrin is derived. The invention is applicable to the concentration of neutral or acid aqueous halohydrin solutions ranging from about 1% halohydrin up to the concentration of the halohydrin-water azeotrope. The maximum advantage is realized, however, in the concentration of relatively weak solutions, as for example, solutions having a concentration of halohydrin of from 4 to 15%.

One specific instance of a suitable application of the present invention in which the heat consumption has been determined is given in the following example, which I submit solely for the purpose of furthering the understanding and appreciation of my invention. The apparatus consisted and was arranged essentially as shown schematically in Fig. I, to which figure the reference numbers refer.

*Example*

An aqueous 6% solution of ethylene chlorhydrin container in a tank 1 was fed continually at a constant rate to an intermediate portion of a fractionating column 3 via a pipe 2. The spent discharge issued from the bottom of the column (pipe 5) at a temperature of about 101° C. and contained 0.7% ethylene chlorhydrin. The vaporous ethylene chlorhydrin-water mixture taken overhead in column 3 and containing from 38 to 39% ethylene chlorhydrin, passed at a temperature of about 97° C. via a pipe 6 into the center of a second fractionation column 7. The discharged product from the second column issued continually via a pipe 13 at a temperature of about 98° C., and contained 51.1% ethylene chlorhydrin. The overhead product from the second still 7 consisting of 91.6% benzene, 7.9% water and 0.5% ethylene chlorhydrin at a temperature of about 71° C. was passed through a condenser 10 and the condensed distillate collected in a separator 11. The lower aqueous layer from the separator was returned to the first column 3 and the upper hydrocarbon layer was returned to the top of the second column essentially as described. The total heat of vaporization required to effect the concentration from the original 6% solution to the final 51.1% solution was only about 1010 kg. Cal per kg. intake of the 6% solution and the yield was 89.5%.

It will be seen from the foregoing that the thermal economies realizable through the use of the present invention result from a novel combination of steps executed in a novel manner, which novelty is dependent upon the continuous method of execution.

I claim as my invention:

1. A process for the production of an aqueous solution of an alkene halohydrin having a halohydrin concentration greater than in the respective halohydrin-water azeotrope which comprises the steps of introducing a dilute, aqueous, alkene halohydrin solution in a continuous manner into a distillation zone, fractionally distilling said solution while maintaining a rate of introduction and a temperature higher than that adapted to yield a halohydrin-water azeotrope overhead fraction, thereby removing as an uncondensed distillate a more concentrated mixture of halohydrin, conducting said uncondensed distillate continually into a second fractionating apparatus containing an entraining agent, and azeotropically removing a portion of the water whereby a more concentrated aqueous solution of said alkene halohydrin is obtained.

2. A process for the production of an aqueous solution of an alkene halohydrin having a halohydrin concentration greater than in the respective halohydrin-water azeotrope which comprises the steps of introducing a dilute, aqueous, alkene halohydrin solution in a continuous manner into a distillation apparatus, fractionally distilling said solution while maintaining a rate of introduction higher than that adapted to yield a halohydrin-water azeotrope overhead fraction, thereby removing as an uncondensed distillate a more concentrated mixture of halohydrin, but containing less halohydrin than the respective halohydrin-water azeotrope, conducting said uncondensed distillate continually into a second fractionating apparatus containing an entraining agent, and azetropically removing a portion of the water whereby a more concentrated aqueous solution of said alkene halohydrin is obtained.

3. A process for the production of an aqueous solution of an alkene halohydrin having a halohydrin concentration greater than the respective halohydrin-water azeotrope which comprises the steps of introducing a dilute aqueous acidic alkene halohydrin solution in a continuous manner into a distillation zone, fractionally distilling said solution while maintaining a rate of introduction and a temperature higher than that adapted to yield a halohydrin-water azeotrope overhead fraction, thereby removing as an uncondensed distillate a more concentrated mixture of halohydrin, conducting said uncondenser distillate continually into a second fractionating apparatus containing an entraining agent, and azeotropically removing a portion of the water whereby a more concentrated aqueous solution of said aklene halohydrin is obtained.

4. A process for the production of an aqueous solution of an aklene halohydrin having a halohydrin concentration greater than the respective halohydrin-water azeotrope which comprises the steps of introducing a dilute aqueous acidic alkene halohydrin solution in a continuous manner into a distillation zone, continuously and fractionally distilling said solution, maintaining said distillation zone at a temperature adapted to remove as an uncondensed distillate a more concentrated mixture of halohydrin, said mixture containing les halohydrin than the respective halohydrin-water azeotrope, conducting said uncondensed distillate continually into a second fractionating apparatus containing an entraining agent, and azeotropically removing a portion of the water whereby a more concentrated aqueous solution of said alkene halohydrin is obtained.

5. A process for the production of an aqueous solution of an alkene chlorhydrin having a chlorhydrin concentration greater than the respective chlorhydrin-water azeotrope which comprises the steps of fractionally distilling a dilute, aqueous, alkene chlorhydrin solution in a continuous manner while continuously introducing said dilute solution into the distillation zone, maintaining said rate of introduction and the temperature in the distillation zone above that adapted to produce a chlorhydrin-water azeotrope, thereby removing as an uncondensed distillate a more concentrated mixture of chlorhydrin, said mixture containing less chlorhydrin than the respective chlorhydrin-water azeotrope, conducting said uncondensed distillate continually into a second fractionating apparatus containing an entraining agent, and azeotropically removing a portion of the water whereby a more concentrated aqueous solution of said alkene chlorhydrin is obtained.

6. A process fo the production of an aqueous solution of an ethylene halohydrin having a halohydrin concentration greater than in the respective ethylene halohydrin-water azeotrope which comprises the steps of continuously introducing a dilute, aqueous ethylene halohydrin solution in a continuous manner into a distillation apparatus, fractionally distilling said dilute solution while maintaining a rate of introduction and a temperature higher than that adapted to form the respective halohydrin-water azeotrope distillate, thereby removing as an uncondensed distillate a more concentrated mixture of halohydrin, said mixture containing less halohydrin than the respective ethylene halohydrin-water azeotrope, conducting said uncondensed distillate continually into a second fractionating apparatus containing an entraining agent, and azeotropically removing a portion of the water whereby a more concentrated aqueous solution of said ethylene halohydrin is obtained.

7. A process for the production of an aqueous solution of ethylene chlorhydrin having a chlorhydrin concentration greater than in the respective ethylene chlorhydrin-water azeotrope (42%) which comprises the steps of fractionally distilling a dilute, aqueous ethylene chlorhydrin solution in a continuous manner while continuously introducing said dilute solution into the distillation zone, maintaining said distillation zone at a temperature adapted to remove as an uncondensed distillate a more concentrated mixture of ethylene chlorhydrin, said mixture containing less than 42% chlorhydrin, conducting said uncondensed distillate continually into a second fractionating apparatus containing an entraining agent, and azeotropically removing a portion of the water whereby a product containing between 42.5 and 90% ethylene chlorhydrin is obtained.

8. A process for the production of an aqueous solution of ethylene chlorhydrin having a chlorhydrin concentration between 42.5 and 90% which comprises the steps of continually conveying an aqueous solution of ethylene chlorhydrin containing between 4 and 15% ethylene chlorhydrin into a distillation zone, fractionally distilling said aqueous ethylene chlorhydrin solution maintaining the rate of introduction into said distillation zone and the temperature therein higher than that adapted to yield an ethylene chlorhydrin-water azeotrope overhead, thereby removing as an uncondensed distillate a vaporous mixture of ethylene chlorhydrin and water containing between 38 and 39% ethylene chlorhydrin, conducting said uncondensed distillate into a second fractionating apparatus containing benzene as an entraining agent, and azeotropically removing a portion of the water whereby a product containing between 42.5 and 90% of ethylene chlorhydrin is obtained.

9. A process for the production of an aqueous ethylene chlorhydrin solution having a chlorhydrin concentration greater than in the respective ethylene chlorhydrin-water azeotrope from aqueous ethylene chlorhydrin solutions containing between about 4% and 15% of ethylene chlorhydrin, which comprises continuously introducing said dilute aqueous chlorhydrin solution into a distillation zone, maintaining temperature conditions in said distillation zone whereby an ethylene chlorhydrin-water mixture containing less chlorhydrin than the respective ethylene chlorhydrin-water azeotrope is continuously vaporized at a temperature of about 97° C., continuously withdrawing said vapor mixture from said distillation zone, conducting said vaporous mixture, without any previous condensation thereof, into a second fractionating zone containing benzene as an entraining agent, and azeotropically distilling a benzene-water mixture, whereby a portion of the water distilled from the first distillation zone is removed and whereby a product containing more than 42.5% ethylene chlorhydrin is obtained.

WILHELM CAREL BREZESINSKA SMITHUYSEN.